Figure 1:
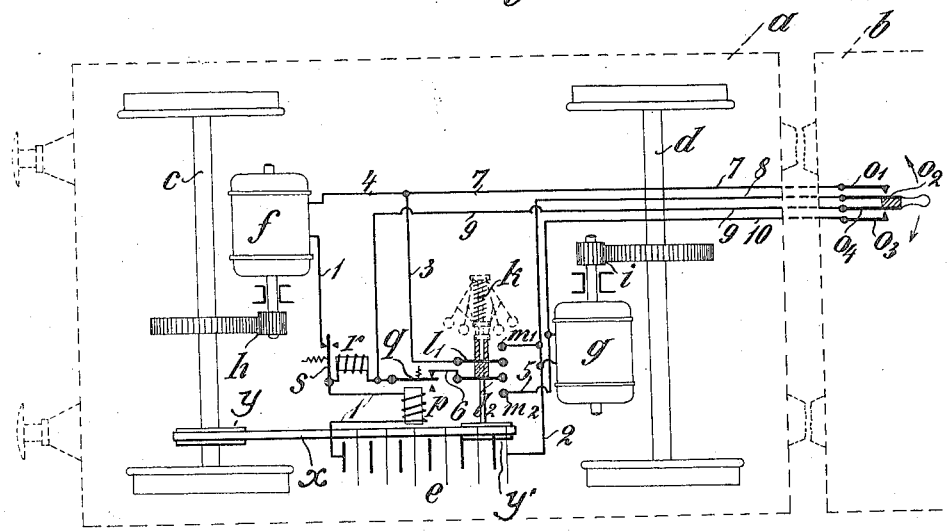

O. WULFERDING.
ARRANGEMENT FOR THE SERVICE ON RAILROADS.
APPLICATION FILED NOV. 26, 1912. RENEWED JUNE 23, 1916.

1,206,493.

Patented Nov. 28, 1916.
2 SHEETS—SHEET 1.

Witnesses:

Inventor:
Otto Wulferding

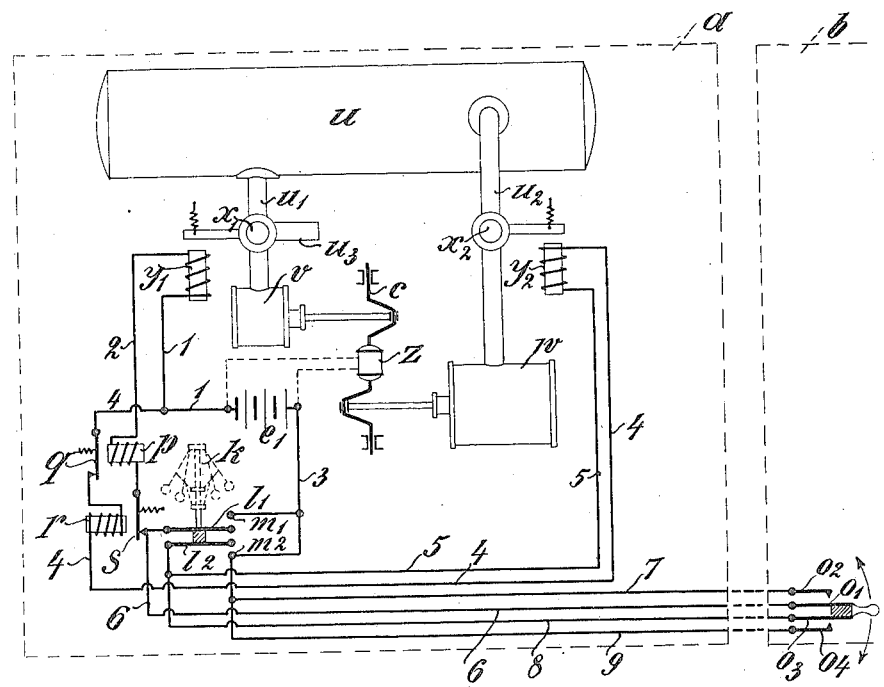

UNITED STATES PATENT OFFICE.

OTTO WULFERDING, OF HACIENDA ARAGON, TURRIALBA, COSTA RICA.

ARRANGEMENT FOR THE SERVICE ON RAILROADS.

1,206,493.  Specification of Letters Patent.  Patented Nov. 28, 1916.

Application filed November 26, 1912, Serial No. 733,708. Renewed June 23, 1916. Serial No. 105,520.

*To all whom it may concern:*

Be it known that I, OTTO WULFERDING, citizen of Costa Rica, and residing at Hacienda Aragon, Turrialba, Costa Rica, have invented certain new and useful Improvements in an Arrangement for the Service on Railroads, of which the following is a specification.

The present invention relates to an arrangement for the service on railroads, in particular for railroads worked by steam or with other thermal engines and consists essentially in the employment of a special car in which the principal devices for storing the energy obtained in running down gradients and in braking the train and for again delivering such energy for running up gradients and starting the train. By the adoption of such a suitably equipped car in a steam railroad train the service can be greatly improved and regulated, either automatically or under the control of the engine driver without the arrangements on board the engine having to be altered to any considerable extent, and engines of a smaller capacity may be used for lines containing alternating up and down gradients, that would be possible if such auxiliary car were not employed.

The storing of the energy accumulated on down gradients or according to the discretion of the engine driver, also on the level line, may be effected in the auxiliary car in different manners, for instance in electric storage batteries, or also in a compressed air accumulator and the electrical and mechanical arrangements of the auxiliary car may be of different characters according to the respective system of generating the power and delivering the same chosen.

For generating and storing the electric energy in the auxiliary car either one or several dynamos driven by various means from the axles of the car, direct or indirectly and one or several storage batteries charged by said dynamo or dynamos and supplying again electric motors with current may be used, or electrical machines may be employed which can be run alternately as dynamos and as motors.

When a compressed air accumulator is employed on board the auxiliary car one or several compressors may be used for producing the compressed air, in direct or indirect connection with the axles of the car and compressed air engines or various, suitable designs, which do not form the subject of the present invention, may be adopted. So for instance such compressed air engines may be either reciprocating piston engines or turbines.

The engaging and disengaging of the machines and arrangements on the auxiliary service car when a purely electrical outfit is employed, as well as the engaging and disengaging of the machines, the control of the valves and the like, when a compressed air plant is employed, from the engine may according to the present invention be preferably effected by means of simple electrical switch arrangements. Besides these simple switch gears on the engine the only additional devices which have to be there provided will be the possibly easily detachably fitted measuring and controlling devices.

The control and operation of the machines and arrangements on the auxiliary car by the engine driver may also be assisted, or may be partly or entirely replaced by automatic devices on the auxiliary car. These automatic devices may then effect the engaging and disengaging of the machinery on board the auxiliary car when going down gradients or up, without any manipulation on board the engine being necessary, and these automatic devices may be either electrical, mechanical or combined electro-mechanical. So for instance in known manner centrifugal governors may be employed for controlling electric switches or for throwing over valves; such automatic arrangements may essentially be employed for short up and down gradients while the engaging and disengaging of the machinery on board the auxiliary car by the engine driver will be employed when putting on the brakes, when starting and if necessary also on long level lines and where is a surplus of power produced by the engine. According to the present invention provision must be made, that the intentional engaging and disengaging of the machinery on board the auxiliary car by the engine driver will not be rendered unnecessary or impossible by the said automatic devices on board the auxiliary car. For this purpose the automatic devices on the auxiliary car will be cut out, when a switching or a control is effected from the engine.

The machines may be coupled to the axles of the auxiliary car by aid of electrical or mechanical coupling gears which act either automatically or are operated from the engine, or the machines may also run continuously, sometimes idle. The arrangements may be very manifold and are not particularly specified in the present application.

Any available room on board the auxiliary car may be utilized for conveying mails, parcels or in other suitable manner. Preferable is the equipment of the auxiliary car as the lighting station for the train, the electric lighting plant or the compressed gas plant for the lighting of the car being installed here, possibly in combination with the other arrangements of the car. The auxiliary car may further serve a double purpose by being fitted as fire extinguishing car, tool and workshop car or as a salvage car.

The accompanying drawings show diagramatically a few constructional forms of the service arrangement according to the present invention.

Figure 2:
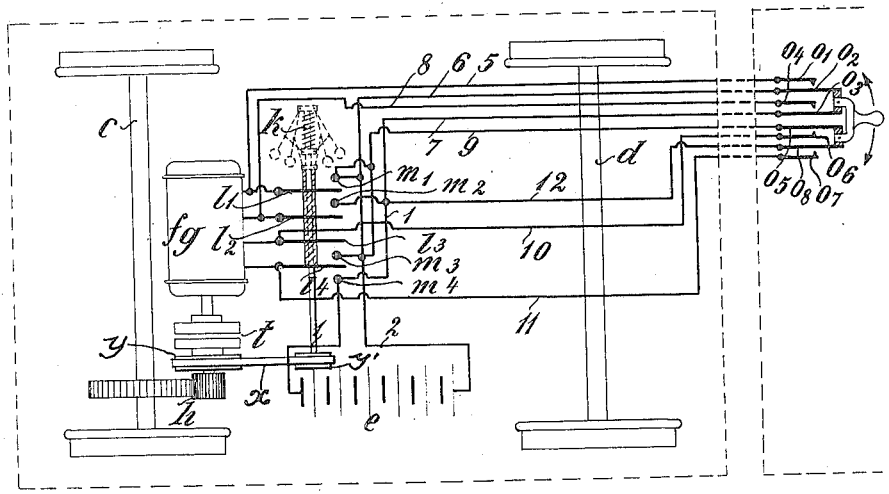

Figure 1 is the diagram of an arrangement with a dynamo and an electric motor. Fig. 2 is the diagram of an electrical arrangement with a service machine which may alternately run as dynamo and as electric motor respectively. Fig. 3 is the diagram of an arrangement for compressed air service.

In all figures the diagrammatical outlines of the auxiliary car are indicated by the letter $a$, those of the rear end of the engine with $b$; the axles of the wheels of the auxiliary car, shown in Figs. 1 and 2, are marked $c$ and $d$ respectively.

In the arrangement of the auxiliary car $a$ shown in Fig. 1 a storage battery $e$ is provided, which is charged by a dynamo $f$, and will temporarily drive an electric motor $g$. In the diagram Fig. 1 these two machines are for sake of greater simplicity, shown as coupled to the axles $c$ and $d$ by means of ordinary gearing $h$ and $i$ respectively. Also for sake of greater simplicity all self-evident auxiliary parts, such as resistances, cell switches, measuring and controlling apparatus have been omitted.

In all figures the engaging and disengaging of the machines on board the auxiliary car is effected by means of a centrifugal governor $k$ of any suitable type, the fly ball type of centrifugal governor being shown (indicated by dotted lines) which is driven from one of the axles of the car by means of the belt $x$ running on the pulleys $y$ and $y'$, or in any other suitable manner of gearing the governor shaft to one of the axles.

The member $c$ slidable on the governor shaft and operated by the action of the governor carries the switch member $l'$ and $l^2$ arranged in such a manner that they ordinarily do not contact with the members $m^1$ and $m^2$ of the switch. However, if the car and governor fall below or rise above a given speed the governor immediately acts to form a connection with the proper member of the switch $l$. The same governor arrangement as shown in Fig. 1 is used in the device shown in Fig. 2, except that more switch members are necessary. When the speed of the car falls below a given point the motor is engaged and when the speed of the car rises above a given point the dynamo or the compressed air service of the compressors is engaged.

In Fig. 1 the switch $l$ consists of two insulated levers $l_1$ $l_2$, of which $l_1$ coöperates in the position closing the circuit with a contact $m_1$, $l_2$ with a contact $m_2$. In the upper position of the centrifugal switch, thus at an increased speed of the car, say when running down gradients the charging circuit of the battery $e$ is closed from the dynamo $f$ over a lead 1, lead 2 from the other pole of the battery $e$, the contact $m_1$, the switch lever $l_1$ and the leads 3 and 4. At the lower position of the switch $l$ thus at a reduced speed of the car, say when going up a gradient or when the train is being stopped, the electric motor $g$ is connected to the battery circuit by means of the leads 2, 5, the contact $m_2$, the switch lever $l_2$, and the leads 6 and 1.

For cutting out the dynamo or the electric motor by hand from the engine a switch $o$ is provided, and when this switch is operated the contacting members of the centrifugal switch $l$, acting in the same sense, will be shortcircuited and the parts acting in an opposite sense will be automatically cut out so that it is impossible for the centrifugal governor to be operated in an opposite sense when the handpower switch is being operated from the engine, for instance in braking, when on a clear line the battery is to be temporarily charged, or when for a time the full engine power and also the motoric power of the auxiliary car are to be utilized. At the upper position of switch $o$ in Fig. 1 the contact members $o_1$, $o_2$ contact with each other and the charging circuit of the battery and the dynamo $f$ over the leads 4, 7, 8, 2 and 1 is closed. A small electric magnet $p$ connected in the lead 1 or also shunted to this lead will thereby open a switch $q$ in the lead of the electric motor $g$ being connected until the dynamo $f$ has been cut out by the hand switch. At the lower position of this hand switch, at which the contact members $o_3$, $o_4$ are in contact the electric motor $g$ is connected over the leads 1, 6, 9, 10 and 2, while the electric magnet $r$ in the lead 6 will at the same time have opened the switch lever $s$ in the upper part of the lead 1 to the dynamo $f$.

Instead of connecting the electric magnets $p$ and $r$ in the main circuit, these electric magnets may also be connected in shunt circuits, as their consumption of current is but very small. Instead of directly connecting and disconnecting the dynamo and the electric motor, or besides such connecting and disconnecting devices also electric coupling devices may be employed for connecting and disconnecting these machines with the respective axles of the car. In place of the centrifugal governors also small dynamo-electric machines may be employed which feed electromagnetic switches. If necessary also the small dynamo machines may be fitted on the shaft of the centrifugal governor.

In the constructional form diagrammatically shown in Fig. 2 in which the service machine runs temporarily as dynamo and temporarily as electric motor, and which has therefore been marked $f$ $g$, an electric coupling is indicated between the machine and the gearing $h$ without the electric leads for this coupling having been shown in detail. The electric current flows from the service machine $f$ $g$ as dynamo over the switch $l_1$, the contact $m_1$ and the lead 2 to the storage battery $e$ and thence through the lead 1 to the contact $m_2$, over the switch lever $l_2$ back to the machine. When the machine is connected as electric motor the current is connected from the battery $e$ over the lead 1, the contact $m_4$, switch lever $l_4$ the machine $f$ $g$, the switch lever $l_3$, the contact $m_3$ and the lead 2.

When the machine is connected as dynamo by means of the hand switch on the engine, the circuit of the battery $e$ is closed from the machine $f$ $g$ over the lead 5, the contact $o_1$, $o_2$, the hand switch, the lead 6, lead 2, battery $e$, lead 1, lead 7, contacts $o_3$, $o_4$ of the hand switch in its upper position and the lead 8. At the lower position of the hand switch on the engine the battery current flows over the lead 2, lead 9, the contacts $o_5$, $o_6$ of the hand switch, the lead 10, the machine $f$ $g$, as electric motor, the lead 11 the contacts $o_7$, $o_8$ of the hand switch and the leads 12 and 1.

In the Fig. 2 the electric magnets $q$ and $r$ have been omitted as there arrangement is the same as in Fig. 1, the same as the respective cutting out levers for cutting out the centrifugal governor to be cut out by the hand switch, are self evident.

In the service arrangement exemplified by Fig. 3, for compressed air service in place of the electrical machinery the letter $u$ indicates the compressed air accumulator which is connected by means of a pipe $u_1$ with the compressor $v$, driven from the axle $c$, and by a pipe $u_2$ with the compressed air engine $w$. By means of a reversible cock $x_1$ the compressor can be connected either with the compressed air accumulator $u$, or with an exhaust pipe $u_3$ for running idle. The reversible cock $x_2$ in the pipe $u_2$ will open and shut off this communication between the accumulator $u$ and the compressed air engine $w$. In the contructional form shown these cocks are controlled by an electric magnet each, $y_1$, $y_2$, which are fed from a small battery $e_1$, which may, if desirable, be charged, as shown in the drawing by a small generator $z$ fitted to the axle of the car. The centrifugal governor $k_1$ will in this case, when in its upper position close the circuit of the battery $e_1$ over the electric magnet $y_1$, which will thereby move the cock $x_1$ into the position producing a communication between the compressor $v$ and the accumulator $u$, so that compressed air will be accumulated. When the electric magnet $y_2$ is switched on, the cock $x_2$ in pipe $u_2$ will open a communication between the compressed air accumulator $u$ and the compressed air engine $w$, which will thus be driven and will transmit its energy to the axle $c$ of the road wheel.

The battery current flows at the upper position of the centrifugal switch, thus when the speed is increased by a down gradient, over the lead 1, the electric magnet $y_1$, the lead 2, the small cut-out magnet $p$, the cut-out contact lever $s$, the switch lever $l_1$, and the contact $m_1$ of the centrifugal switch and the lead 3 back to the battery. When the compressed air engine $w$ is connected by the opening of the cock $x_2$ the battery current flows over the lead 1, the lead 4, the cut-out switch $q$, the electric magnet $r$, the extension of the lead 4, the electric magnet $y_2$, the lead 5, the lever $l_2$, the centrifugal switch and the lead 3 to the other pole of the battery $e_1$.

When the hand switch on board the engine is reversed into its upper position, the battery current will flow from the battery $e_1$ over the lead 1, the electric magnet $y_1$ for the cock, the lead 2, the cut-out electric magnet $p$, the cut-out lever $s$, the lead 6, the contacts $o_1$, $o_2$ of the hand switch, the lead 7 and the lead 3. In the lower position of the hand switch the battery circuit is closed over the leads 1 and 4, the cut-out lever $q$, the cut-out electric magnet $r$, the extension of the lead 4, the electric magnet $y_2$ of the cock, the lead 5, the lead 8, the contacts $o_3$, $o_4$ of the hand switch and the leads 9 and 3.

Instead of in the leads 2 and 4 respectively the cut-out electric magnets $p$ and $r$ may also be connected in one of the leads 6 or 7 and 8 or 9 respectively, which lead to the hand switch.

In place of a compressed air accumulator $u$ also several accumulators and in place of a compressed air engine $w$, two or more such engines may be employed. The arrangement might also be such, that the compressor $v$ can also be working while the compressed air engine is running. For avoiding inadmissible excessive pressures in the accumulator $u$ selfacting safety valves which will open at a given maximum pressure, or will cut-out the compressor or connect it with the exhaust, may be provided.

In place of the centrifugal switch also any other device under action of the speed of the car may be employed, for instance a small electric generator, which is driven by suitably rated gearing from an axle of the car, and the voltage of which will within given minimum and maximum limits be used either directly or indirectly for operating the switch gears for the purposes of the present invention. The switching on and off of the dynamo and the electric motor, or of the compressed air service of the compressor and the compressor air engine may also be effected by one or several mercury turbine switches or circuit breakers, which are driven at the varying speed of travel from the car axle.

The electric connection between the arrangements on board the auxiliary car and the hand switch on board the engine is preferably made by means of a lead coupling of the known kind for the flexible cable. The hand switch need neither be rigidly fitted to the engine, but may be detachable and portable, as hereinbefore said, together with the other attachments so that when the auxiliary car is connected in the train these devices can be fitted to any engine.

The present service system for steam railroads by means of an auxiliary car containing all arrangements for the auxiliary power service, in which car temporarily energy will be accumulated partly automatically, partly under the control of the engine driver, so that such accumulated energy may in case of requirement be again delivered for assisting the main driving power of the engine, in particular in starting and on up gradients, will afford considerable advantages in practical service. It will thereby be possible to accumulate in a manner known for other purposes, the great brake energy of the heavy steam trains and subsequently again utilize the same; in particular for increasing the driving power, and therefore for accelerating the starting of such heavy trains which will thereby be better enabled to compete with the rapidly starting electric full gage railways. The new service system will also allow of a saving in fuel.

Besides the modifications of the service system already mentioned in the foregoing, the hand switch on the engine may also be positively coupled to a steam governor, so that at least certain operation will be effected without any separate manipulation. When compressed air service is employed it will also be possible to produce compressed gas for the furnaces of the engine in the compressor plant of the auxiliary car.

What I do claim as my invention, and desire to secure by Letters Patent, is:

1. In a railroad service arrangement with accumulation of energy in braking the train or when running down gradients, and transmission of energy for assisting the main driving power of the engine of trains, a special auxiliary service car, coupled in the said train and containing an independent plant for accumulating energy gained during the journey and delivering and utilizing such energy for the purposes of running the said train, the said plant in said auxiliary car consisting of an electric generator driven from the axle of the car, an electric motor coupled with an axle of the car, a storage battery and mechanical and electrical switch devices in the auxiliary car, adapted to connect at given speeds of the train either the generator or the motor with the said storage battery and so temporarily employ this battery for accumulating energy and temporarily for supplying electric energy, substantially as and for the purpose described.

2. In a railroad service arrangement with accumulation of energy in braking the train or when running down gradients, and transmission of energy for assisting the main driving power of the engine of trains, a special auxiliary service car, coupled in the said train and containing an independent plant for accumulating energy gained during the journey and delivering and utilizing such energy for the purposes of running the said train, the said plant in said auxiliary car consisting of an electric generator driven from the axle of the car, an electric motor coupled with an axle of the car, a storage battery and mechanical and electrical switch devices in the auxiliary car, adapted to connect at given speeds of the train either the generator or the motor with the said storage battery and so temporarily employ this battery for accumulating energy and temporarily for supplying electric energy, the said switch devices of the auxiliary car consisting of a switch controlled by a centrifugal governor, substantially as and for the purpose described.

3. In a railroad service arrangement with accumulation of energy in braking the train or when running down gradients, and transmission of energy for assisting the main driving power of the engine of trains, a special auxiliary service car, coupled in the said train and containing an independent plant for accumulating energy gained during the journey and delivering and utilizing such energy for the purposes of running the said train, the said plant in said auxiliary car consisting of an electric generator driven from the axle of the car, an electric motor coupled with an axle of the car, a storage battery and mechanical and electrical switch devices in the auxiliary car, adapted to connect at given speeds of the train either the generator or the motor with the said storage battery and so temporarily employ this battery for accumulating energy, the said switch devices of the auxiliary car consisting of a switch controlled by a centrifugal governor, a separate hand switch fitted on board of the engine, electric connections between said switch controlled by the centrifugal governor and the hand switch on the engine of such a kind, that when the hand switch on the engine is operated, the automatic switch on the auxiliary car is cut out, substantially as and for the purpose described.

4. In a railroad service arrangement with accumulation of energy in braking the train or when running down gradients, and transmission of energy for assisting the main driving power of the engine of trains, a special auxiliary service car, coupled in the said train and containing an independent plant for accumulating energy gained during the journey and delivering and utilizing such energy for the purposes of running the said train, the said plant in said auxiliary car consisting of an electric generator driven from the axle of the car, an electric motor coupled with an axle of the car, a storage battery and mechanical and electrical switch devices in the auxiliary car, adapted to connect at given speeds of the train either the generator or the motor with the said storage battery and so temporarily employ this battery for accumulating energy, the said switch devices of the auxiliary car consisting of a switch controlled by a centrifugal governor, a separate hand switch fitted on board of the engine, electric connections between said switch controlled by the centrifugal governor and the hand switch on the engine of such a kind, that when the hand switch on the engine is operated, the automatic switch on the auxiliary car is shortcircuited, substantially as and for the purpose described.

5. In a railroad service arrangement with accumulation of energy in braking the train or when running down gradients, and transmission of energy for assisting the main driving power of the engine of trains, a special auxiliary service car, coupled in the said train and containing an independent plant for accumulating energy gained during the journey and delivering and utilizing such energy for the purposes of running the said train, the said plant in said auxiliary car consisting of an electric generator driven from the axle of the car, an electric motor coupled with an axle of the car, a storage battery and mechanical and electrical switch devices in the auxiliary car, adapted to connect at given speeds of the train either the generator or the motor with the said storage battery and so temporarily employ this battery for accumulating energy, the said switch devices of the auxiliary car consisting of a switch controlled by a centrifugal governor, a separate hand switch fitted on board of the engine, electric connections between said switch controlled by the centrifugal governor and the hand switch on the engine of such a kind, that when the hand switch on the engine is operated, the automatic switch on the auxiliary car is cut-out by electromagnetic switches connected in the circuit of the storage battery, substantially as and for the purpose described.

In testimony whereof I affix my signature in presence of two witnesses.

OTTO WULFERDING.

Witnesses:
W. SOLMANS,
HERM. AHRENS.